Oct. 19, 1965 R. B. THOMAS 3,212,176
APPARATUS FOR STAKING AND FORMING TABS
Original Filed Nov. 3, 1960 3 Sheets-Sheet 1

INVENTOR
RALPH B. THOMAS
BY Joseph C. Ryan
ATTORNEY

INVENTOR
RALPH B. THOMAS
BY Joseph C. Ryan
ATTORNEY

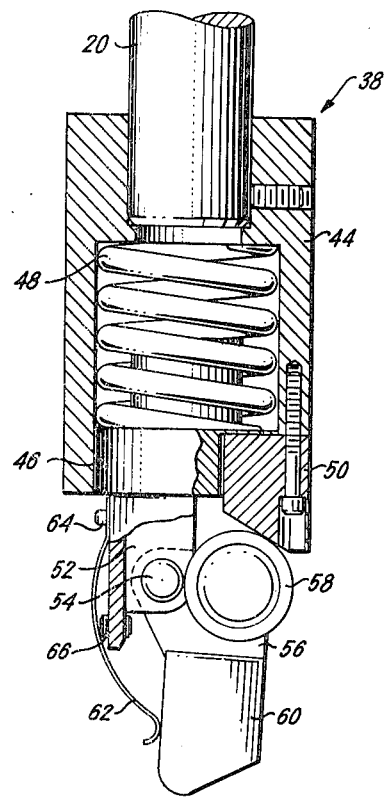
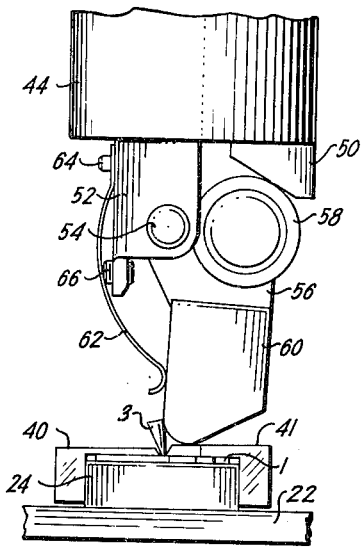
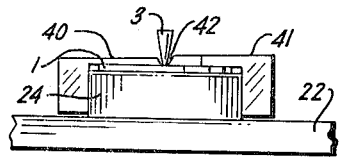
Fig. 6
Fig. 7
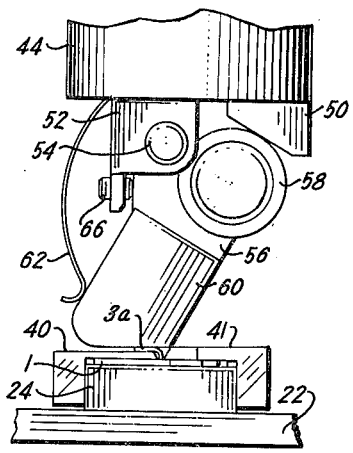
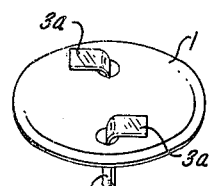
Fig. 9
Fig. 8

United States Patent Office 3,212,176
Patented Oct. 19, 1965

3,212,176
APPARATUS FOR STAKING AND
FORMING TABS
Ralph B. Thomas, Salem, Mass., assignor to Sylvania
Electric Products Inc., a corporation of Massachusetts
Original application Nov. 3, 1960, Ser. No. 72,266, now
Patent No. 3,112,786, dated Dec. 3, 1963. Divided
and this application Aug. 8, 1963, Ser. No. 316,196
2 Claims. (Cl. 29—243.5)

This application is a division of my copending application, Serial No. 72,266, filed November 3, 1960, for Method of and Apparatus for Staking and Forming Tabs which issued as U.S. Patent No. 3,112,786 on December 3, 1963.

This invention relates to the manufacture of electrical devices having lead-in wires extending therefrom and bases or caps to which the lead-in wires are connected for the establishment of electrical connections therethrough. More particularly, this invention relates to the assembly and fabrication of the base or cap components in the manufacture of electric lamps and the like.

In the co-pending application of Stanley C. Shappell and Ralph B. Thomas, Serial Number 763,619, filed September 26, 1958, entitled "Lamp Base," now abandoned, there is shown and described a particular type of lamp base construction. In the specific embodiment of this invention illustrated in the accompanying drawings and described below, particular reference is made to a base of this construction. However, it will be appreciated by those skilled in the art that the method of this invention may be practiced, and the apparatus may be modified as required, in the manufacture of other base assemblies.

The apparatus of this invention may be practiced on automatic, semi-automatic or manually-operated equipment. In the specific embodiment of the invention illustrated in the accompanying drawings, the apparatus is depicted as practiced on a piece of manually-operated equipment, viz., an arbor press.

In the drawings, FIGURE 1 is a front elevational view of an arbor press, showing particularly a pin-staking assembly depending from the arbor press ram and in alignment with the work disposed on an adapter jig.

FIGURE 6 is a front elevational view, partly in section, showing the pin bending and flattening assembly in alignment with but spaced from the work disposed on an adapter jig over which a slotted spacing anvil has been positioned.

FIGURE 7 is a front elevational view showing the flattening iron of the pin bending and flattening assembly in engagement with the work at an early stage in its operation thereon.

FIGURE 8 is a front elevational view of the pin bending and flattening assembly, showing the relative disposition of the several components thereof during the final stage of the pin bending and flattening operation.

FIGURE 9 is a perspective view of the completed article of work.

Figure 1:
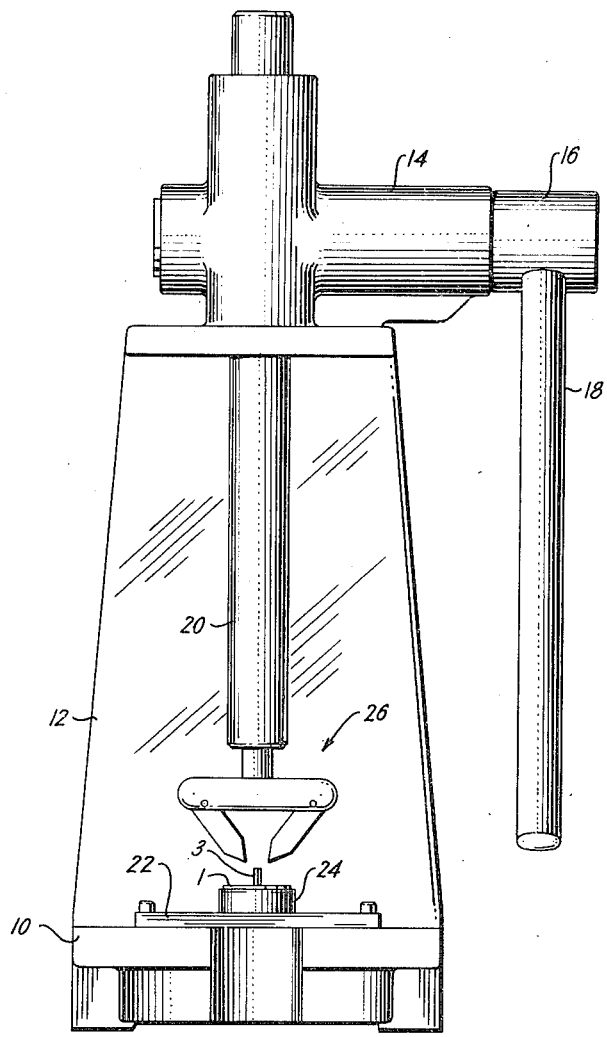

Referring now to the drawings, particularly FIGURE 1 thereof, the arbor press comprises a base 10, a frame 12 upstanding thereon, and a housing 14 mounted on the top of the frame 12. A shaft 16, extending through and rotatably supported within housing 14, is provided with a pinion (not shown) intermediate the ends thereof, and an operating lever 18 depending from an end thereof. A ram 20, having a rack (not shown) formed thereon intermediate the ends thereof, extends through and depends from housing 14. The pinion of shaft 16 meshes with the rack of ram 20, thus providing the means through which manipulation of operating lever 18 is translated into the stroke of ram 20. The base 10 of the arbor press has a base plate 22 mounted on the top surface thereof. Dowels (not shown) upstanding on the base plate 22 provide means for effecting accurate positioning of an adapter jig 24. A pin-staking assembly 26, attached to and depending from the ram 20, is in alignment with the work disposed on the adapter jig 24.

Figure 2:
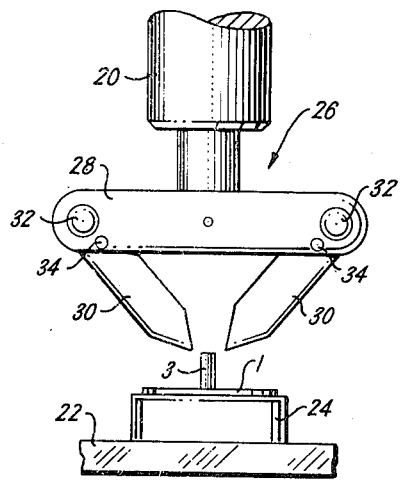
FIGURE 2 is a front elevational view showing the pin-staking assembly in alignment with but spaced from the work disposed on an adapter jig.
Figure 4:
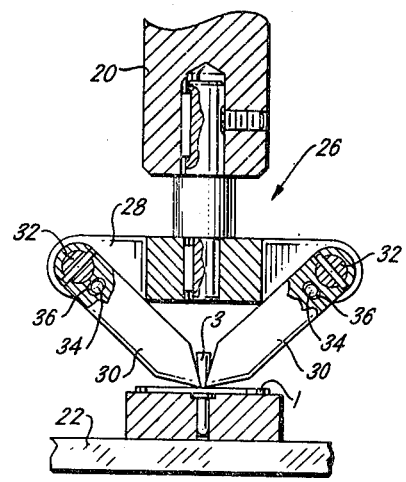
FIGURE 4 is a front elevational view, partly in section, showing the pin-staking assembly in operative relationship with respect to the work.
Figure 3:
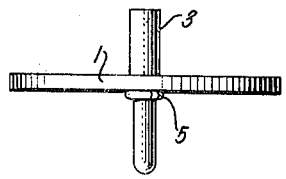
FIGURE 3 is an elevational view of the work components before staking has been effected.
Figure 5:
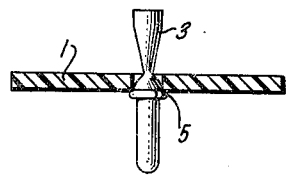
FIGURE 5 is an elevational view, partly in section, of the work components after staking has been effected.

The pin-staking assembly 26 (FIGS. 2 and 4) comprises a crossbar 28 and a pair of toggle arm crimping jaws 30 pivotally mounted on pins 32 at the extremities of the crossbar, the freedom of movement of the jaws 30 being limited by pins 34 extending through elongated slots 36 in crossbar 28. The work seated on the adapter jig 24 comprises a disc 1 of insulating material and a pair of pins 3 (one of which is shown in FIGS. 3–5) extending therethrough. Each of the pins 3 is a hollow member provided with a beaded shoulder 5 abutting the lower face of the disc 1 as shown in FIGURE 3. The pin may be a two-diameter member, as shown in the drawings, depending on the desired size of the tab on the one hand and the receptacle with which the electrical device is used on the other hand. With the work components shown in FIGURE 3 seated on the adapter jig 24 with a pin 3 in axial alignment with the ram 20 as shown in FIGURE 2, the operating lever 18 of the arbor press (FIG. 1) is manipulated to effect a downward stroke of ram 20. As the ram 20 moves downwardly, the V edges of the jaws 30 contact the top surface of the disc 1 (FIG. 4) on opposite sides of pin 3. Further downward movement of the ram 20 causes a cam action of the pivotally mounted jaws 30 on the top surface of the disc 1 and effects a closing of the jaws with respect to one another and a pinching of the pin 3 therebetween. Simultaneously, the direct downward thrust of the ram 20 presses the disc 1 against the beaded shoulder 5 of the pin 3. These combined forces lock the pin in place, the beaded shoulder 5 thereof being drawn tightly against the lower face of the disc and the lateral elongation thereof, due to the pinching action of the jaws 30, overlying the upper face of the disc. The condition of the work after the operation of the pin-staking assembly thereon is shown in FIGURE 5. After one of the pins 3 has been staked as described, the position of the work on the adapter jig 24 is altered to place the other pin 3 in axial alignment with the pin-staking assembly 26 and a similar operation is performed thereon.

The next operation on the work is performed by a tab-forming assembly 38 which is illustrated in detail in FIGURE 6. In the specific embodiment of the invention illustrated in the accompanying drawings, the pin-staking assembly 26 (FIG. 1) is detached from the ram 20 after it has performed the above-described operation on the work, and the tab-forming assembly 38 is substituted therefore to permit the tab-forming operation on the work to be accomplished. The tab-forming operation is performed by the tab-forming assembly 38 in cooperation with a spacing anvil 40 which is slipped over the adapter jig 24 on which the work is seated. The spacing anvil 40 is provided with a V slot 42 for pin clearance. The spacing anvil 40 is further characterized by a raised portion 41 on the top right surface thereof as viewed in FIGS. 6–8, the elevation thereof being approximately equal to twice the wall thickness of the hollow pin 3.

The tab-forming assembly 38 (FIG. 6) comprises ram sleeve 44 attached to and depending from ram 20 and a plunger 46, loaded by spring 48, disposed within sleeve 44 and retained therein by a cam 50 attached to the sleeve 44. The plunger 46 is provided with a depending bracket 52, preferably formed integral therewith, which supports a rod 54 on which a rocker arm 56 is mounted. The rocker arm 56 serves as a mounting member on which cam follower 58 and flattening iron 60 are mounted. The cam follower 58 is biased against cam 50 by a flat spring 62, one end of which is attached to the bracket 52 at 64. The other end of spring 62 frictionally engages a face of iron 60, sufficient force being exerted thereby to normally urge rocker arm 56 counter-clockwise and thus maintain cam follower 58 in engagement with cam 50. The bracket 52 is provided with a stop screw 66 which, as will be noted from an examination of FIGURE 8, serves to limit the amount that rocker arm 56 can rotate clockwise during the actual tab-forming operation.

With the work and the tab-forming assembly 38 disposed as shown in FIGURE 6, the operating lever 18 of the arbor press (FIG. 1) is manipulated to effect a downward stroke of ram 20. As the ram 20 moves downwardly, initially, the entire tab-forming assembly 38 moves therewith as a unit, the flattening iron 60 thereof deflecting the pin 3 as shown in FIGURE 7. With the lower face of the flattening iron 60 now in engagement with the raised portion 41 of the top surface of the spacing anvil 40, and with the pin 3 constituting an obstacle in the path of the flattening iron 60, the downward stroke of the ram 20 continues but carries with it only the ram sleeve 44 and the cam 50 attached to and depending therefrom. The force exerted by the cam 50 on its cam follower 58 during this portion of the downward stroke causes rocker arm 56 to rotate clockwise about its pivot 54. Clockwise rotation of rocker arm 56 causes the flattening iron 60 which is attached thereto to swing with a wiping action against pin 3 while the plunger spring 48 continues to force flattening iron 60 downwardly under increasing pressure as the downward movement continues until, as shown in FIGURE 8, the pin 3 has been completely folded over with the resulting tab compressed between the lower face of flattening iron 60 and the top surface of spacing anvil 40. During the final phase of the downward stroke of the ram 20, the entire force on the work is one of compression, the wiping action of the iron 60 having been arrested by the stop screw 66 which limits the clockwise rotation of rocker arm 56.

With one tab now formed, the ram 20 is retracted, the work is re-arranged on the adapter jig 24 and the tab-forming operation is repeated on the other pin 3 in a similar manner. In the resultant article, shown in perspective in FIGURE 9, the tabs 3a of the pins 3 are spaced from the top surface of disc 1 an amount substantially equal to the thickness of the top surface of the spacing anvil 40. Although the tabs 3a in FIGURE 9 are substantially parallel to one another and extend in opposite directions, the specific arrangement thereof as shown is not critical, but rather, a matter of choice, depending in part on the tab center spacing desired, regardless of the center spacing of the outer ends 3b of the pins.

Although the specific embodiment of the apparatus of my invention is illustrated in the accompanying drawings and described above as being associated with a semi-automatic, manually-operated unit, viz., an arbor press, it will be readily understood and appreciated by those skilled in the art that the apparatus of my invention is readily adaptable to automatic equipment. For example, on an indexing, turret-type machine, a pin-staking assembly 26 could be located at each of two succeeding stations for the sequential staking of a pair of pins, and a tab-forming assembly 38 could be located at each of two succeeding stations for the sequential formation of a pair of tabs. At the latter two stations, means could be provided for reciprocating a spacing anvil 40 into and out of position over the work and the adapter jig 24 on which it is seated.

What I claim is:

1. Apparatus for affixing a pin having a beaded shoulder intermediate the ends thereof to a disc of insulating material having an aperture therein through which the pin extends, said apparatus comprising: a jig having an aperture therein for receiving the beaded shoulder of said pin and that portion of said pin extending below said shoulder, the disc of insulating material being disposed on the top surface of said jig; a ram disposed above and in axial alignment with said pin; a crossbar attached to and depending from said ram; a pair of toggle arm crimping jaws pivotally mounted on said crossbar, the free ends of said jaws being substantially V-shaped; and means for moving said ram downwardly to bring said free ends of said jaws into engagement with both the disc and the pin, the downward movement of the ram effecting both a drawing up of the beaded shoulder tightly against the lower face of said disc and a pinching of said pin to cause a lateral elongation thereof overlying the upper face of said disc.

2. Apparatus for affixing a pin having a beaded shoulder intermediate the ends thereof to a disc of insulating material having an aperture therein through which the pin extends, said apparatus comprising: a jig having an aperture therein for receiving the beaded shoulder of said pin and that portion of said pin extending below said shoulder, the disc of insulating material being disposed on the top surface of said jig; a ram disposed above and in axial alignment with said pin; a crossbar attached to and depending from said ram; a pair of toggle arm crimping jaws pivotally mounted on said crossbar and depending therefrom, the free ends of said jaws being substantially V-shaped; means for limiting the freedom of movement of said toggle arm crimping jaws about their pivots; and means for moving said ram downwardly to bring said free ends of said jaws into engagement with both the disc and the pin, the downward movement of the ram effecting both a drawing up of the beaded shoulder tightly against the lower face of said disc and a pinching of said pin to cause a lateral elongation thereof overlying the upper face of said disc.

References Cited by the Examiner

UNITED STATES PATENTS

| | | | |
|---|---|---|---|
| 116,012 | 6/71 | Beecher | 78—66 |
| 868,067 | 10/07 | Berry | 78—46 X |
| 1,796,852 | 3/31 | McDonough | 78—46 X |
| 2,675,719 | 4/54 | Merchant | 78—45 |
| 2,736,948 | 3/56 | Barnes | 29—35 |
| 2,827,685 | 3/58 | Cleghorn | 78—60 |
| 3,068,555 | 12/62 | Thomas | 29—509 |
| 3,091,838 | 6/63 | Hild | 29—509 |
| 3,101,633 | 8/63 | Klosek | 78—45 |
| 3,112,786 | 12/63 | Thomas | 140—71.6 X |

WILLIAM J. STEPHENSON, *Primary Examiner.*

RICHARD H. EANES, JR., *Examiner.*